(12) United States Patent  
Zhang et al.

(10) Patent No.: US 12,450,786 B2  
(45) Date of Patent: Oct. 21, 2025

(54) AUGMENTED REALITY INTERACTIVE DISPLAY METHOD AND DEVICE

(71) Applicant: Lemon Inc., Grand Cayman (KY)

(72) Inventors: Runze Zhang, Los Angeles, CA (US); August Yadon, Los Angeles, CA (US); Michael Carpenter, Los Angeles, CA (US); Cesar Montero, Culver City, CA (US); Dan Noskin, Culver City, CA (US)

(73) Assignee: LEMON INC., Grand Cayman (KY)

( * ) Notice: Subject to any disclaimer, the term of this patent is extended or adjusted under 35 U.S.C. 154(b) by 323 days.

(21) Appl. No.: 18/020,799

(22) PCT Filed: Aug. 26, 2021

(86) PCT No.: PCT/SG2021/050509  
§ 371 (c)(1),  
(2) Date: Feb. 10, 2023

(87) PCT Pub. No.: WO2022/093110  
PCT Pub. Date: May 5, 2022

(65) Prior Publication Data  
US 2023/0306654 A1    Sep. 28, 2023

(30) Foreign Application Priority Data

Oct. 30, 2020 (CN) .......................... 202011194034.0

(51) Int. Cl.  
*G06T 11/00* (2006.01)  
*G06T 19/00* (2011.01)

(52) U.S. Cl.  
CPC ............ *G06T 11/00* (2013.01); *G06T 19/006* (2013.01)

(58) Field of Classification Search  
CPC ........ G06T 11/00; G06T 17/00; G06T 19/006  
(Continued)

(56) References Cited

U.S. PATENT DOCUMENTS 10,482,674 B1 * 11/2019 Wu ....................... G09B 25/00  
2014/0292809 A1    10/2014 Tsurumi  
(Continued)

FOREIGN PATENT DOCUMENTS

CN    104808510 A    7/2015  
CN    106548519 A    3/2017  
(Continued)

OTHER PUBLICATIONS

Notice of Allowance for Chinese Patent Application No. 202011194034. 0, mailed Apr. 19, 2024, 6 pages.

(Continued)

*Primary Examiner* — Jacinta M Crawford  
(74) *Attorney, Agent, or Firm* — Astute IP Law Group

(57) ABSTRACT

A method and device for augmented reality interactive display, and the method includes: acquiring scene scale information, in which the scene scale information is used for characterizing dimension information of a real-world environment represented by an augmented reality space of a first client, determining display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client, and displaying the virtual object in the augmented reality space of the first client according to the display scale information.

20 Claims, 11 Drawing Sheets

(58) Field of Classification Search
USPC .......................................................... 345/633
See application file for complete search history.

(56) References Cited

U.S. PATENT DOCUMENTS

2017/0235458 A1    8/2017   Tsurumi
2017/0270715 A1*   9/2017   Lindsay .................... G06T 7/60

FOREIGN PATENT DOCUMENTS

| CN | 106910249 A | 6/2017 |
| CN | 107168532 A | 9/2017 |
| CN | 107185245 A | 9/2017 |
| CN | 108027658 A | 5/2018 |
| CN | 108427498 A | 8/2018 |
| CN | 109697755 A | 4/2019 |
| CN | 109903129 A | 6/2019 |
| CN | 109934635 A | 6/2019 |
| CN | 112308980 B | 5/2024 |

OTHER PUBLICATIONS

International Search Report and Written Opinion in PCT/SG2021/050509, mailed Nov. 21, 2021, 15 pages.

* cited by examiner

AUGMENTED REALITY INTERACTIVE DISPLAY METHOD AND DEVICE

This application is a 35 U.S.C. § 371 National Phase of International Patent Application No. PCT/SG2021/050509, filed on Aug. 26, 2021, which claims the priority and the benefit of Chinese Patent Application No. 202011194034.0, filed on Oct. 30, 2020, the entire contents of which are incorporated herein by reference as part of the present application.

TECHNICAL FIELD

Embodiments of the present disclosure relate to a method and device for augmented reality interactive display.

BACKGROUND

Augmented reality (AR) is a new technology for realizing content convergence between real world information and virtual world information by simulating and superimposing a virtual object onto a real-world environment, which may enhance the visual perception of a user.

At present, in a scene based on the AR technology, content delivery and representation are realized only by a virtual object created in an AR space.

However, such a manner of content delivery merely by means of the virtual object in the AR space leads to the virtual object not matching the real-world environment of a user, resulting in distorted visual representation of the AR space and thus affecting the effect of visual display. Moreover, in a scene involving multi-user interaction, the experience of interaction among a plurality of users is also reduced.

SUMMARY

Embodiments of the present disclosure provide a method and device for augmented reality interactive display to overcome the problems of the distorted visual representation of an AR space which affects the effect of visual display and reduces the experience of interaction among a plurality of users.

In a first aspect, the present disclosure provides a method for augmented reality interactive display, the method includes:
  acquiring scene scale information, in which the scene scale information is used for characterizing dimension information of a real-world environment represented by an augmented reality space of a first client;
  determining display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client; and
  displaying the virtual object in the augmented reality space of the first client according to the display scale information.

In a second aspect, the present disclosure provides a device for augmented reality interactive display, the device includes:
  an acquisition unit, configured to acquire scene scale information, in which the scene scale information is used for characterizing dimension information of a real-world environment represented by an augmented reality space of a first client;
  a determination unit, configured to determine display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client; and
  a display unit, configured to display the virtual object in the augmented reality space of the first client according to the display scale information.

In a third aspect, the present disclosure provides an electronic device, the electronic device includes: at least one processor and a memory,
  in which the memory stores computer executable instructions; and
  the at least one processor executes the computer executable instructions stored on the memory, and the computer executable instructions, upon execution by the processor, cause the at least one processor to implement the method for augmented reality interactive display as described in the first aspect and various possible designs of the first aspect above.

In a fourth aspect, the present disclosure provides a computer-readable storage medium, on which computer executable instructions are stored, in which the computer executable instructions, when executed by a processor, cause the processor to implement the method for augmented reality interactive display as described in the first aspect and various possible designs of the first aspect above.

The embodiments provide the method and device for augmented reality interactive display. The method includes: acquiring scene scale information, where the scene scale information is used for characterizing dimension information of a real-world environment represented by an augmented reality space of a first client; determining display scale information of a virtual object according to the scene scale information and reference scale information, where the reference scale information is used for characterizing dimension information of the virtual object in a reference environment, and the display scale information is used for characterizing dimension information of the virtual object in the augmented reality space of the first client; and displaying the virtual object in the augmented reality space of the first client according to the display scale information. Since the display scale information of the virtual object is adjusted according to the scene scale information in combination with the reference scale information, the display scale information of the virtual object in the augmented reality space may match the scene scale information. Thus, the virtual object may be displayed in the augmented reality space on a more appropriate scale and be closer to the real-world environment, resulting in making the virtual object closer to the real-world environment, improving the visual display effect of the virtual object, and enhancing the experience of interaction among a plurality of users.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure. For those skilled in the art, other drawings may be obtained from these drawings without any inventive work.

DETAILED DESCRIPTION

Figure 1A:
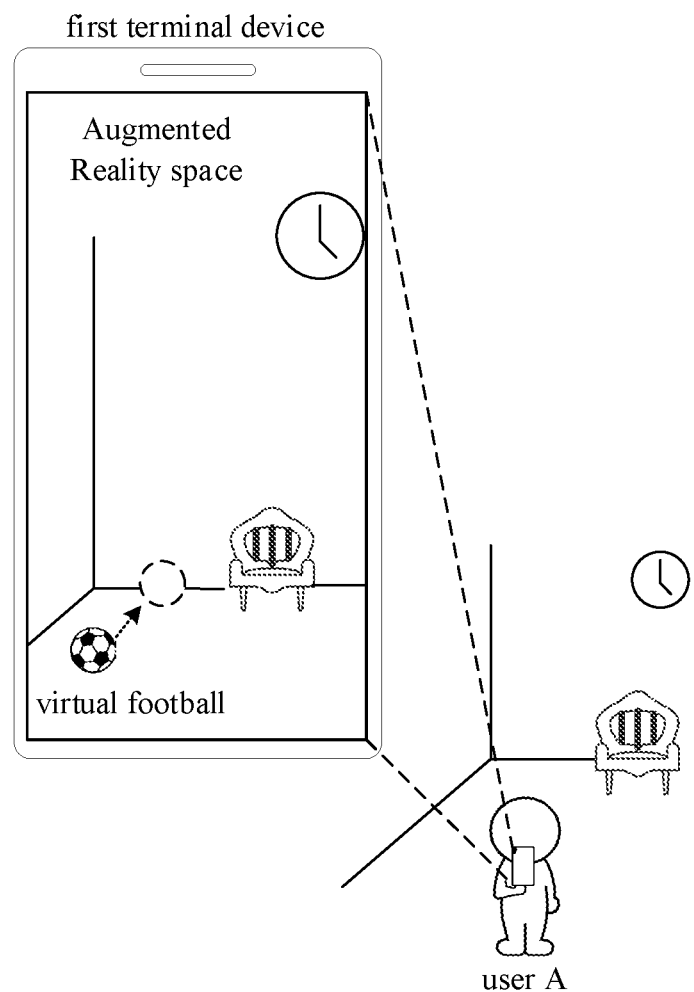
FIG. 1A is a schematic diagram of an application scene based on AR according to embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can acquire other embodiment(s), without any inventive work, which should be within the scope of the present disclosure.

Firstly, terms involved in the embodiments of the present disclosure are explained below.

1) An augmented reality is called AR for short. The augmented reality, which may also be referred to as extended reality, involves simulating a real object information which is unlikely to be played in a spatial scope of the real world and superimposing it onto an image corresponding to the real-world environment, allowing people to perceive through visual perception and thus to have a sensual experience beyond reality. A picture and space displayed after the superimposing of the virtual object onto the real-world environment is called an AR space. The AR space may show not only the image information of the real-world environment, but also the image information of the virtual object superimposed onto the real-world environment. Thus, users may see the real-world environment and the virtual object simultaneously in the AR space.

2) A terminal device, also referred to as a terminal or a user device, is a device for providing voice and/or data connectivity to users, for example, a hand-held device or a vehicle-mounted device with a wireless connection function. The terminal device may also be a device for detecting data, such as a sensor. The terminal device may also be a smart device, such as a smart home device deployed in a room, and a wearable device. Common terminal devices, for example, include: an air quality monitoring sensor, a temperature sensor, a smoke sensor, a mobile phone, a tablet computer, a notebook computer, a palm computer, a mobile internet device (MID), and a wearable device, where the wearable device, for example, include: a smart watch, a smart bracelet, a pedometer, etc. The terminal devices are existing and future possible terminal devices of wireless communication or terminal devices of wire communication.

3) The term "a plurality of" refers to two or more than two, and other quantifiers are similar to this term. The term "and/or" describes associations between associated objects and indicates three types of relationships. For example, A and/or B may indicate three situations: A exists alone, A and B exist simultaneously, or B exists alone. The character "/" generally indicates that the associated objects are in an "or" relationship.

4) The term "corresponding to" may refer to an association relationship or a binding relationship. A corresponding to B refers to that A is in an association relationship or a binding relationship with B.

It needs to be noted that the terms involved in the embodiments of the present disclosure may refer to one another, which will not be described redundantly.

FIG. 1A is a schematic diagram of an application scene based on AR according to embodiments of the present disclosure. Referring to FIG. 1A, in the scene provided in this embodiment, a user A collects image information of surrounding environment through an application (APP) running on a terminal device and superimposes a virtual object and information onto an image of a real-world environment. Thus, various applications based on AR, such as an AR game and an AR map, may be realized.

Figure 1B:
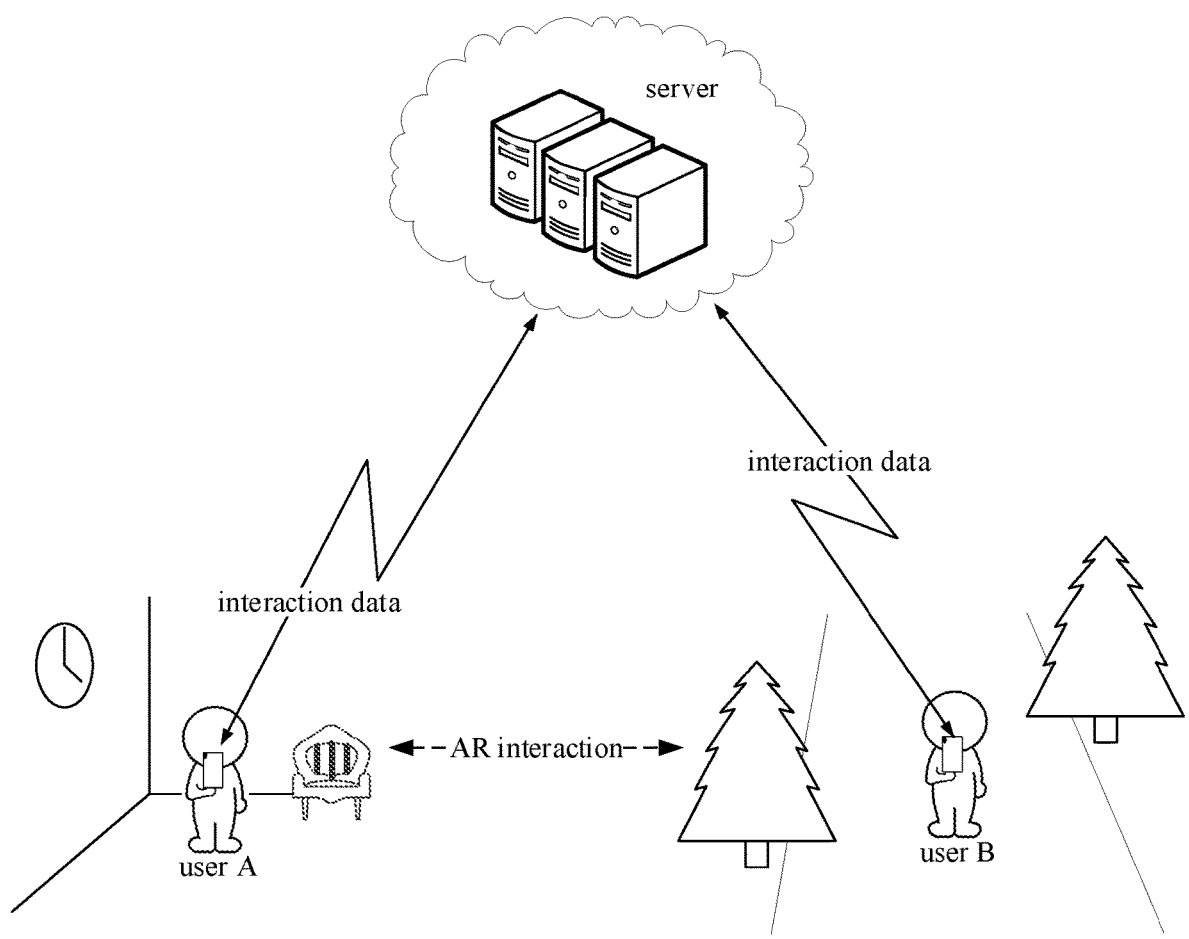
FIG. 1B is a schematic diagram of a multi-user interaction application scene based on AR according to embodiments of the present disclosure.

On the basis of FIG. 1A, FIG. 1B is a schematic diagram of a multi-user interaction application scene based on AR according to embodiments of the present disclosure. Referring to FIG. 1B, in the scene provided in this embodiment, user A and user B are in communication connection with a server through terminal devices, respectively, and interact with data through processing and forwarding by the server, allowing for cross-scale AR interaction in different environments. The terminal device may be, for example, a smart phone. The user may run a preset APP on the terminal device to realize, for example, a multi-user interactive game based on AR.

Figure 2:
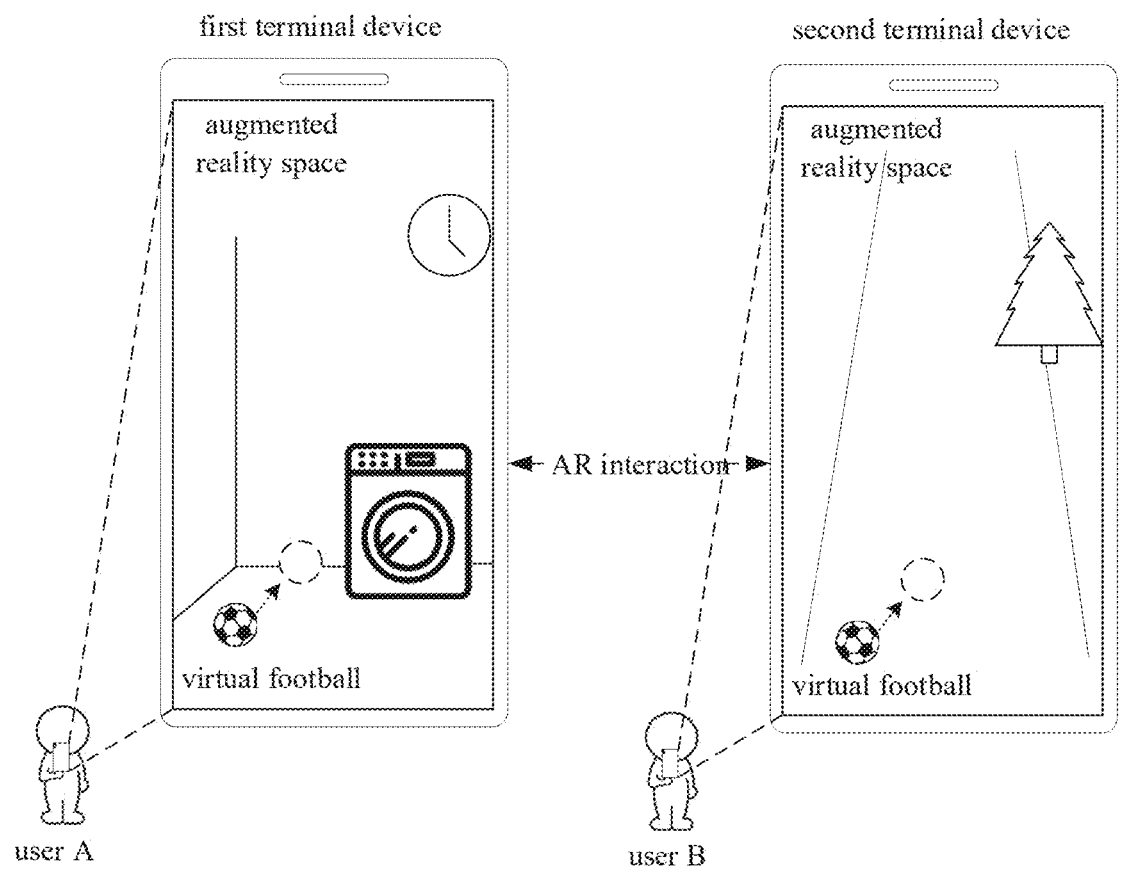
FIG. 2 is a schematic diagram illustrating a method for AR interactive display in the prior art.

FIG. 2 is a schematic diagram illustrating a method for AR interactive display in the prior art. Referring to the schematic diagram of the application scene shown in FIG. 1B and the schematic diagram shown in FIG. 2, in a multi-user interaction scene based on AR in the prior art, content delivery and representation are performed among a plurality of users only by means of a virtual object created in an AR space, thereby realizing interaction among the plurality of users. For example, as shown in FIG. 2, there is a virtual football in an AR space displayed by a first terminal device, and there is also a virtual football in an AR space displayed by a second terminal device. When user A inputs an operation instruction to cause the virtual football displayed in the AR space corresponding to the first terminal device to move, the virtual football displayed in the AR space corresponding to the second terminal device may also move synchronously, thereby realizing interaction between user A and user B.

However, when realizing the above-mentioned multi-user interaction based on AR in the prior art, interactive content is represented only by means of the virtual object in the AR space without considering a matching relationship between the real-world environment and the virtual object in the AR space. This is because, unlike an offline single-user AR application scene, in the multi-user interaction scene based on AR, due to different real-world environments of users, it is impossible to set a unified scene scale, so that a virtual object can be displayed in the AR spaces of a plurality of terminal devices on the unified scale. As shown in FIG. 2, the size and moving distance of the virtual football displayed in the AR space corresponding to the second terminal device are determined with reference to the size and moving distance of the virtual football displayed in the AR space corresponding to the first terminal device. However, the second terminal device and the first terminal device are placed in difference environments. Specifically, the first terminal device is placed in a room with narrow space, and the virtual football moves in a narrow area at a corner. The second terminal device is placed outdoors with open space, and the virtual football may be displayed in a larger size and move in a larger range. Thus, the size and moving distance of the virtual football displayed in the AR space corresponding to the first terminal device do not match the real-world environment in the AR space corresponding to the second terminal device, resulting in problems that the size and movement of the virtual football in the AR space corresponding to the second terminal device being unable to match an open environment visually, which affects the visual display effect and reduce the experience of AR interaction between users.

Embodiments of the present disclosure provides a method for augmented reality interactive display to solve the problems described above.

Figure 3:
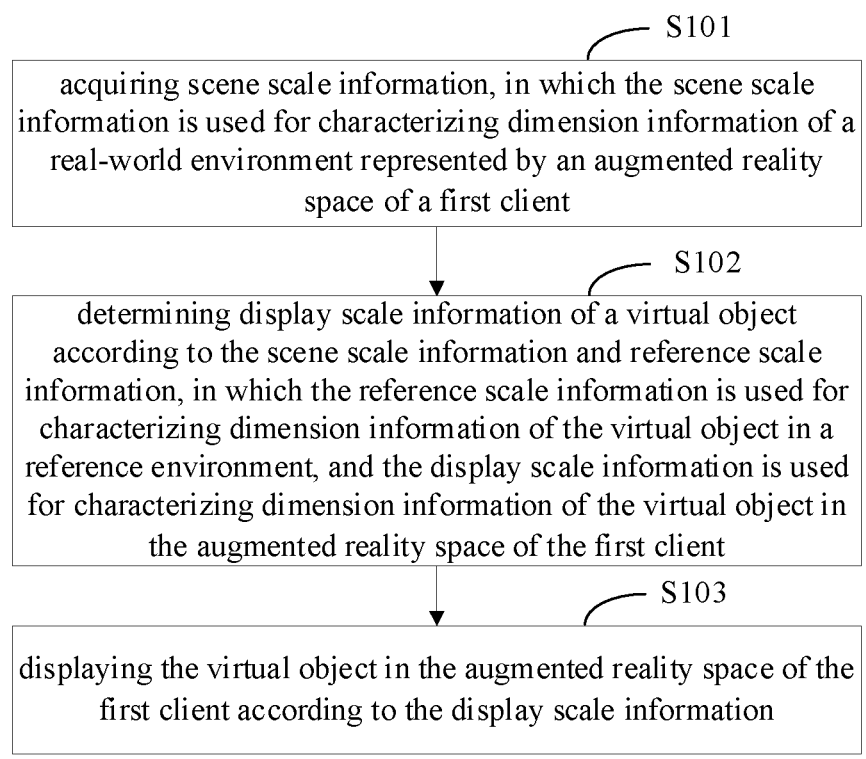
FIG. 3 is a first flowchart of a method for augmented reality interactive display according to embodiments of the present disclosure.

FIG. 3 is a first flowchart of a method for augmented reality interactive display according to embodiments of the present disclosure. The method provided in this embodiment may be applied to a first terminal device. The method for augmented reality interactive display includes steps described below.

S101: acquiring scene scale information, in which the scene scale information is used for characterizing dimension information of a real-world environment represented by an augmented reality space of a first client.

Exemplarily, the first terminal device is, for example, a smart phone. In a possible implementation, a first client for realizing an interaction function based on AR runs on the first terminal device. More specifically, the first client is, for example, an APP based on AR running on the smart phone, or an APP based on AR running on smart glasses. Further, the first client acquires the scene scale information of the real-world environment by means of the first terminal device, and displays the augmented reality space through a human-machine interaction interface of the first terminal device, allowing users to see the augmented reality space through the first terminal device and then to visually perceive the real-world environment and a virtual object superimposed onto the real-world environment in the augmented reality space. Thus, a plurality of applications based on AR may be realized.

In another possible implementation, a first client used for realizing a multi-user interaction function based on AR, for example, a multi-user AR game client, runs on the first terminal device. The first client may realize interaction based on AR with one or more second clients by communicating with a server. More specifically, the first client is, for example, an APP based on AR running on the smart phone, or an APP based on AR running on smart glasses. In this application scene, the first terminal device and a second terminal device acquire corresponding scene scale information, respectively, and display the augmented reality space through respective human-machine interaction interfaces thereof. Thus, applications based on AR with the multi-user interaction function may be realized.

The scene scale information is used for describing the information of dimensions of the real-world environment represented by the augmented reality space. Exemplarily, when the first terminal device is placed in a large-scale environment (e.g., the real-world environment where the first terminal device is placed is a playground), the real-world environment displayed in the augmented reality space of the first client has large dimensions accordingly. For example, the playground is 100 m long and 50 m wide. In this case, the scene scale information includes the information of a length of 100 m and a width of 50 m. When the first terminal device is placed in a small-scale environment (e.g., the real-world environment where the first terminal device is placed is a room), the real-world environment displayed in the augmented reality space of the first client has small dimensions accordingly. For example, the floor of the room is 6 m long and 3 m wide. Correspondingly, the scene scale information includes the information of a length of 6 m and a width of 3 m. It needs to be noted that the scene scale information may be implemented by a variety of ways. Apart from the above-mentioned examples, the scene scale information may also be implemented by using various types of dimension information such as a volume, a projection area and a diagonal length of the real-world environment, which will not be described here redundantly.

The scene scale information may be acquired by a method of, for example, collecting image information of the real-world environment where the first terminal device is placed by using an image collecting unit, more specifically, a camera, which is provided on the first terminal device, and acquiring the scene scale information from the image information. The image information may be a picture or a video.

More specifically, in a possible implementation, a method of acquiring the scene scale information includes: acquiring video image information of the real-world environment, and determining the scene scale information by a preset simultaneous localization and mapping (SLAM) algorithm according to the video image information. The SLAM algorithm is a method for acquiring position information according to image features. According to the SLAM algorithm, a plurality of image frames of video images of the real-world environment acquired by the image collecting unit such as the camera are processed so that the scene scale information capable of characterizing the dimension information of the real-world environment may be acquired.

The scene scale information may also be acquired by reading, according to an instruction or configuration information input by a user, the scene scale information which is preset on the first terminal device and corresponds to the instruction or the configuration information input by the user. There is no particular limitation on this here.

S102: determining display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client.

Figure 4:
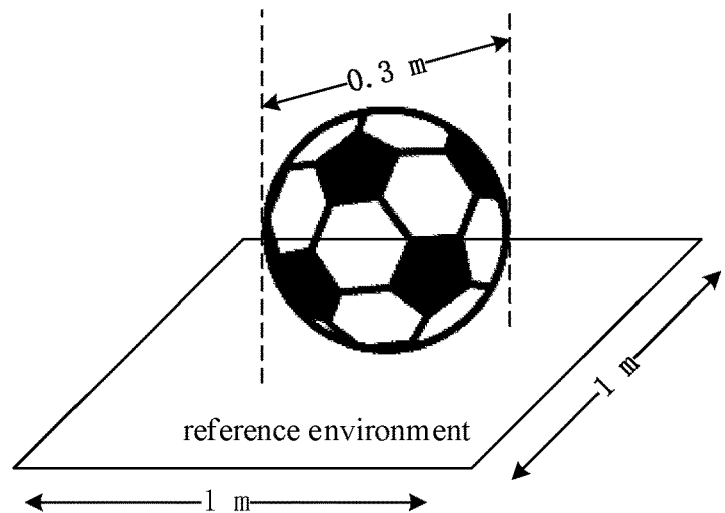
FIG. 4 is a schematic diagram illustrating reference scale information of a virtual object according to embodiments of the present disclosure.

Exemplarily, the virtual object may be a digital model preset in the first client. The virtual object has different dimension information in different environments. When the virtual object is in a preset reference environment, the dimension information thereof is the reference scale information. FIG. 4 is a schematic diagram illustrating reference scale information of a virtual object according to embodiments of the present disclosure. Referring to FIG. 4, the virtual object is a virtual football. When the virtual football is in a reference environment of which the length and the width are both 1 m, the diameter of the virtual football is 0.3 m. Exemplarily, the reference scale information is capable of characterizing the dimension information of 0.3 m of the virtual object. In the case of taking the virtual object and the reference environment as a whole, the dimension information of 1 m of the reference environment may also be used as the reference scale information. This may be determined according to specific situations here. Further, the reference scale information may be data preset in the first client, in which the reference scale information of the virtual object may be modified according to instructions input by a user, in order to allow the virtual object to represent different information contents. Exemplarily, in the case of multi-user interaction, the reference scale information of the virtual object may be determined based on interaction information received on other terminals.

Further, the virtual object may be displayed in the augmented reality space with different dimensions, and the information describing the dimensions of the virtual object displayed in the augmented reality space is display dimension information. To realize matching of the virtual object with the real-world environment, the scene scale information is directly proportional to the display dimension information. That is, the greater the scale of the real-world environment, the larger the display dimensions of the virtual object. Therefore, the display scale information of the virtual object may be determined by scaling up or scaling down the reference scale information according to the scene scale information.

S103: displaying the virtual object in the augmented reality space of the first client according to the display scale information.

Figure 5:
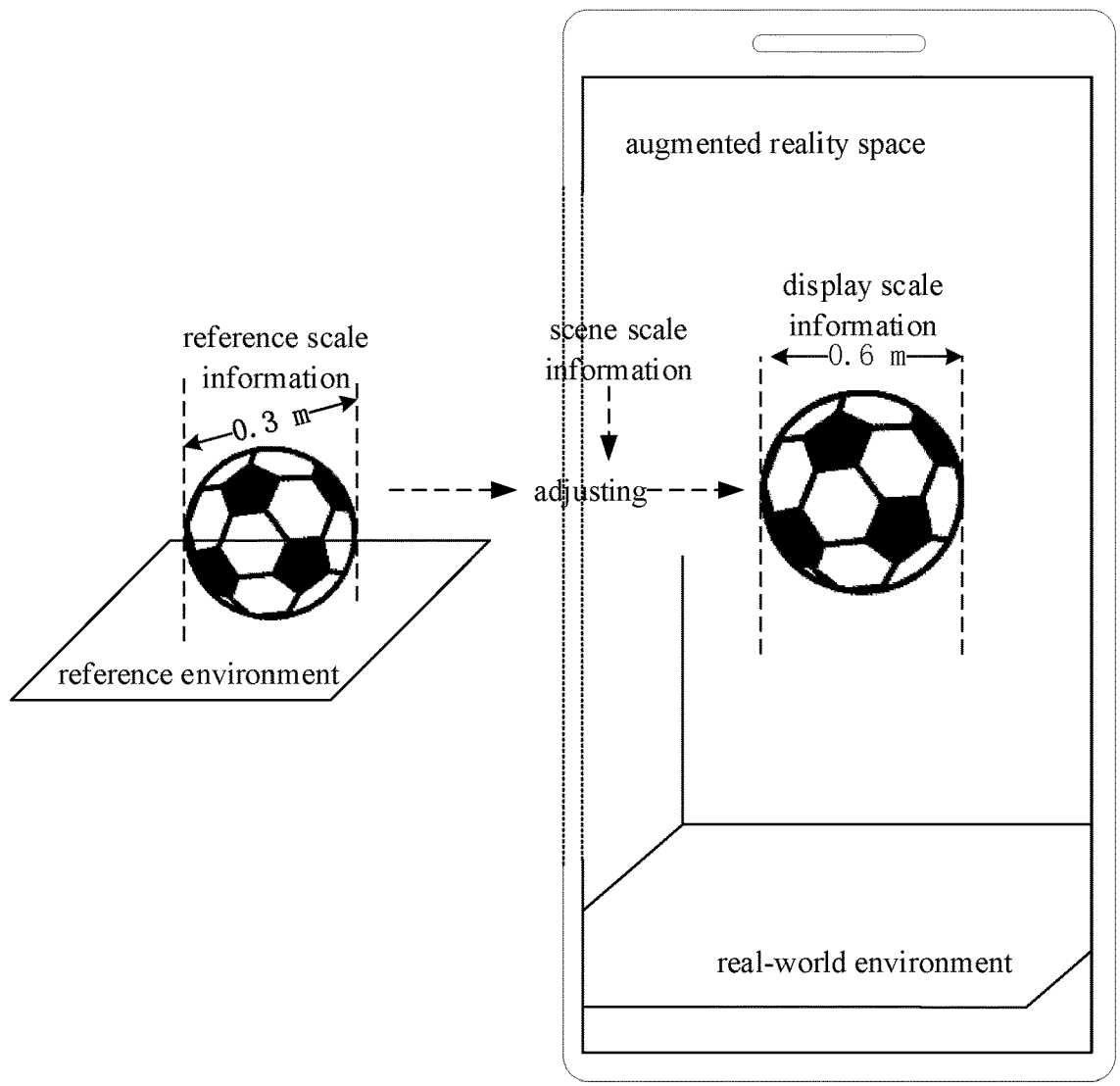
FIG. 5 is a schematic diagram illustrating display scale information of a virtual object according to embodiments of the present disclosure.

FIG. 5 is a schematic diagram illustrating display scale information of a virtual object according to embodiments of the present disclosure. Referring to FIG. 5, the virtual object is a virtual football. The reference scale information of the virtual football is 0.3 m, and the display scale information is determined to be 0.6 m after the reference scale information is scaled up according to the scene scale information. That is, the virtual object is displayed in the augmented reality space of the first client with the dimension of 0.6 m. When a user watches the virtual football in the augmented reality space through the first client, the perceived dimension of the virtual football is 0.6 m. The virtual object is displayed in the augmented reality space according to the display scale information so that the virtual object may match the real-world environment in the augmented reality space. Thus, the purpose of improving the visual representation effect of the virtual object is achieved.

The method for augmented reality interactive display provided in this embodiment includes: acquiring the scene scale information, in which the scene scale information is used for characterizing the dimension information of the real-world environment represented by the augmented reality space of the first client; determining the display scale information of the virtual object according to the scene scale information and the reference scale information, in which the reference scale information is used for characterizing the dimension information of the virtual object in the reference environment, and the display scale information is used for characterizing the dimension information of the virtual object in the augmented reality space of the first client; and displaying the virtual object in the augmented reality space of the first client according to the display scale information. Since the display scale information of the virtual object is adjusted according to the scene scale information, the display scale information of the virtual object in the augmented reality space may match the scene scale information. Thus, the virtual object may be displayed in the augmented reality space on a more appropriate scale and be closer to the real-world environment, resulting in making the virtual object closer to the real-world environment, improving the visual display effect of the virtual object, and enhancing the experience of interaction among a plurality of users.

Figure 6:
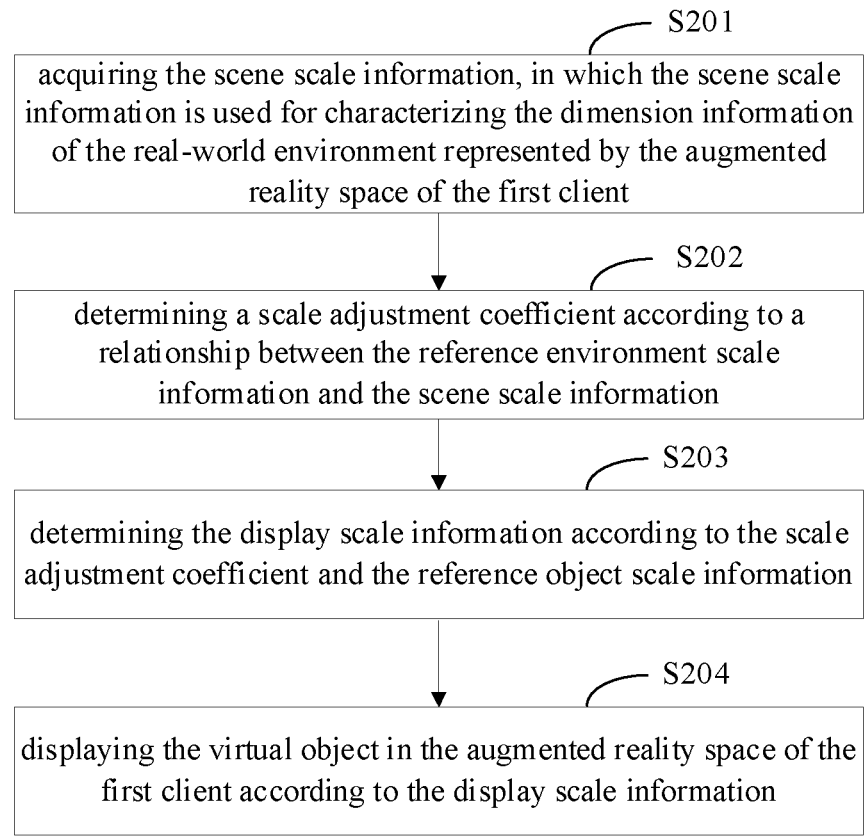
FIG. 6 is a second flowchart of a method for augmented reality interactive display according to embodiments of the present disclosure.

FIG. 6 is a second flowchart of a method for augmented reality interactive display according to embodiments of the present disclosure. This embodiment of the present disclosure provides further details of step S102 on the basis of the embodiment shown in FIG. 3, in which the reference scale information includes reference environment scale information and reference object scale information. The method for augmented reality interactive display includes steps described below.

S201: acquiring the scene scale information, in which the scene scale information is used for characterizing the dimension information of the real-world environment represented by the augmented reality space of the first client.

S202: determining a scale adjustment coefficient according to a relationship between the reference environment scale information and the scene scale information.

Exemplarily, the reference environment scale information is used for describing the information of dimensions of the reference environment, and the reference object scale information is used for characterizing reference dimension information of the virtual object in the reference environment. The dimensions of the virtual object in the reference environment are different from the dimensions of the virtual object displayed in the augmented reality space, and the latter needs to be adjusted according to the dimensions of the real-world environment on the basis of the former such that the virtual object matches the real-world environment. The scale adjustment coefficient is a parameter used for adjusting the dimensions of the virtual object in the reference environment to the dimensions of the virtual object displayed in the augmented reality space. More specifically, the scale adjustment coefficient is a proportionality coefficient. For example, if the scale adjustment coefficient is 2, it characterizes that the dimensions of the virtual object in the reference environment are scaled up to 2 times to acquire the dimensions of the virtual object displayed in the augmented reality space. If the scale adjustment coefficient is 0.4, it characterizes that the dimensions of the virtual object in the reference environment are scaled down to 0.4 times to acquire the dimensions of the virtual object displayed in the augmented reality space. As a matter of course, it may be understood that the scale adjustment coefficient may also be a progression or matrix for characterizing proportional relationships between the virtual object in the reference environment and the virtual object in the augmented reality space in a plurality of dimensions. For example, the scale adjustment coefficient is {0.8, 1.5, 1.2}, characterizing that the dimensions of the virtual object in the reference environment are scaled down to 0.8 times in length dimension, scaled up to 1.5 times in width dimension and scaled up to 1.2 times in height dimension to acquire the dimensions of the virtual object displayed in the augmented reality space. Here, the specific implementation of the scale adjustment coefficient is not limited.

Figure 7A:
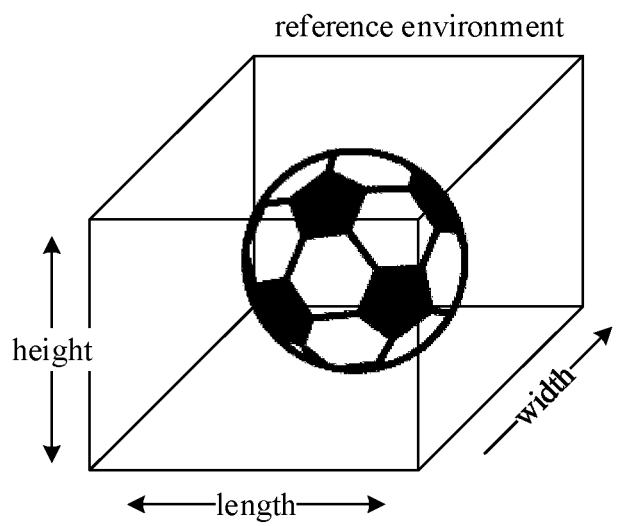
FIG. 7A is a schematic diagram illustrating a reference environment according to embodiments of the present disclosure.
Figure 7B:
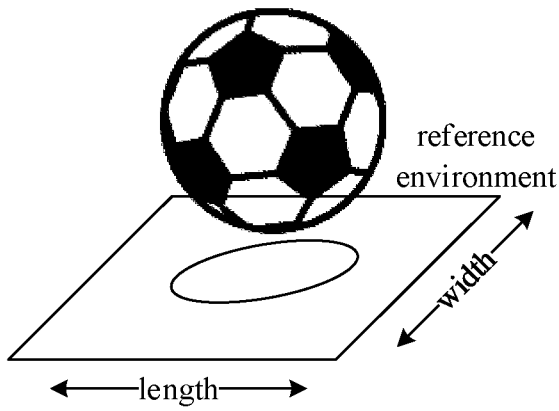
FIG. 7B is a schematic diagram illustrating another reference environment according to embodiments of the present disclosure.

Further, exemplarily, an approach of determining the scale adjustment coefficient may include: determining the scale adjustment coefficient according to the proportional relationship(s) between the reference environment scale information and the scene scale information in one or more dimensions. The reference environment scale information is used for characterizing the dimension information of the reference environment. Reference is then made to FIG. 7A and FIG. 7B. FIG. 7A is a schematic diagram illustrating a reference environment according to embodiments of the present disclosure. In a possible implementation, the reference environment is a cuboid model surrounding the virtual object. The reference environment scale information is, for example, a length of the clinodiagonal of the cuboid model or the volume of the cuboid model. FIG. 7B is a schematic diagram illustrating another reference environment according to embodiments of the present disclosure. In a possible implementation, the reference environment is a rectangular box surrounding the projection of the virtual object. The reference environment scale information is, for example, a side or a diagonal of the rectangular box.

Figure 8:
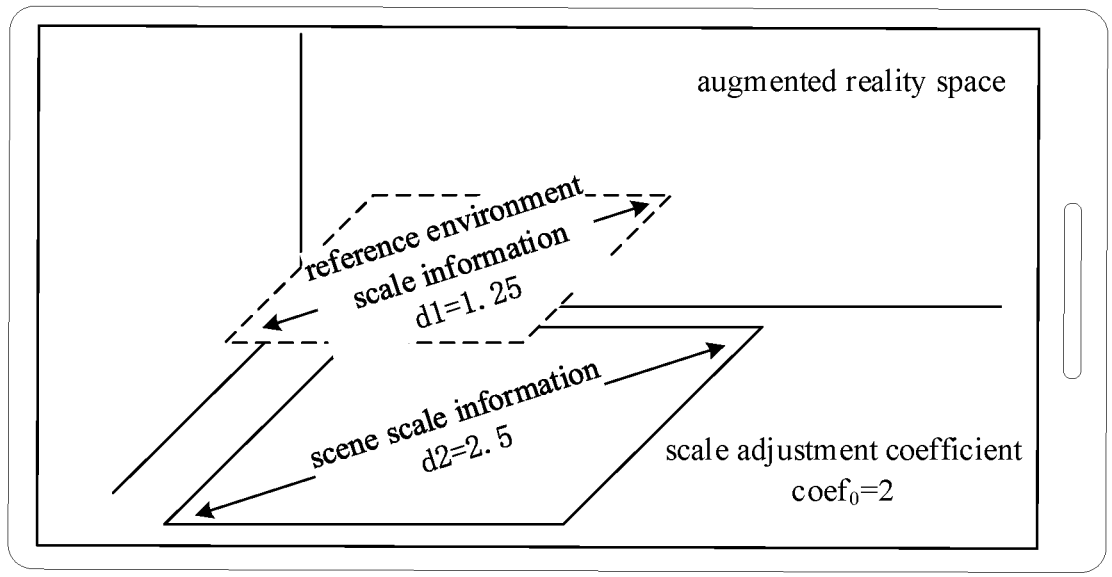
FIG. 8. is a schematic diagram of determining a scale adjustment coefficient according to embodiments of the present disclosure.

FIG. 8. is a schematic diagram of determining a scale adjustment coefficient according to embodiments of the present disclosure. Referring to FIG. 8, taking the diagonal length of the rectangular box being the reference environment scale information $d1$ as an example, exemplarily, the reference environment scale information $d1$ is equal to 1.25, and the scene scale information $d2$ of the real-world environment is equal to 2.5. Thus, it may be determined that the scale adjustment coefficient $coef0$ of the virtual object is equal to 2 according to the proportional relationship between the reference environment scale information $d1$ and the scene scale information $d2$ of the real-world environment represented by the augmented reality space.

Alternatively, the reference environment scale information may also be a sequence or matrix composed of a plurality of dimensions. In a possible implementation, the reference environment scale information is, for example, the size of the cuboid model shown in FIG. 7 in the dimensions of length, width and height. Alternatively, the reference environment scale information is, for example, the size of the rectangular box shown in FIG. 8 in the dimensions of length and width.

Correspondingly, the scene scale information is used for characterizing the dimension information of the real-world environment. Exemplarily, the implementation of the scene scale information corresponds to the implementation of the reference environment scale information. For example, if the real-world environment is a cuboid model or a rectangular box characterizing the environment where the first terminal device is placed, the scene scale information may be the clinodiagonal length or the volume of the cuboid model. Alternatively, the scene scale information may be a side or a diagonal of the rectangular box. The scale adjustment coefficient may be determined through the proportional relationship between the reference environment scale information and the scene scale information in a corresponding dimension. The scale adjustment coefficient may also be a sequence or matrix composed of a plurality of coefficients. If the scale adjustment coefficient is a sequence or matrix composed of a plurality of coefficients, the scale adjustment coefficient is determined by the proportional relationships between the reference environment scale information and the scene scale information in a plurality of corresponding dimensions, which will not be described redundantly.

S203: determining the display scale information according to the scale adjustment coefficient and the reference object scale information.

Exemplarily, the reference object scale information is used for characterizing the reference dimension information of the virtual object in the reference environment. Referring to FIG. 4, the virtual football in FIG. 4 has a diameter of 0.3 m, which is the reference object dimension information. As a matter of course, it may be understood that the reference object dimension information may also be implemented by the volume and one or more dimensions, etc. of the virtual object, and the reference object dimension information may be set as needed, which will not be described here one by one redundantly.

Further, the reference object scale information is adjusted according to the scale adjustment coefficient making the reference object scale information scaled up or scaled down in one or more dimensions to acquire the display scale information. It needs to be noted that the reference object dimension information may be a sequence or matrix composed of a plurality of dimension values to characterize the dimension information of a plurality of dimensions of the virtual object in the reference environment. In a possible implementation, if the scale adjustment coefficient is a sequence or matrix composed of a plurality of coefficients, which correspond to a plurality of dimensions of the virtual object, corresponding weighting adjustment may be performed on a plurality of dimension values in the reference object dimension information according to the scale adjustment coefficient so that a plurality of dimensions of the virtual object may be adjusted according to different proportionality coefficients, allowing the display scale information of the virtual object to match the real-world environment in a plurality of dimensions.

In this embodiment, by setting a multi-dimensional scale adjustment coefficient and a multi-dimensional reference object scale information, the virtual object may be adjusted in a plurality of dimensions, so that the degree, to which the acquired display scale information in the augmented reality space matches the real-world environment in a plurality of dimensions, is increased, and the visual display effect is optimized.

Figure 9:
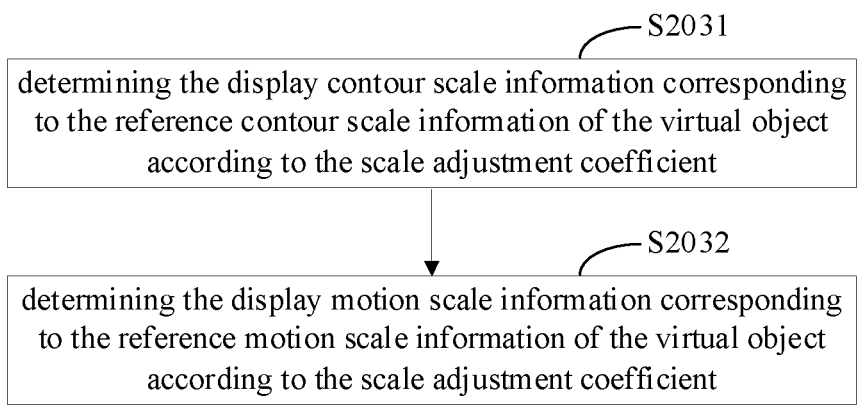
FIG. 9 illustrates specific implementation steps of step S203 in the embodiment shown in FIG. 6.

In a possible implementation, the reference object scale information includes reference contour scale information of the virtual object and reference motion scale information of the virtual object, and the display scale information includes display contour scale information and display motion scale information. As shown in FIG. 9, S203 includes two specific implementation steps S2031 and S2032.

S2031, determining the display contour scale information corresponding to the reference contour scale information of the virtual object according to the scale adjustment coefficient.

Exemplarily, the reference contour scale information is information for characterizing the contour dimension of the virtual object in the reference environment. For example, if the virtual object is a virtual football, its corresponding contour dimension may be any one of the diameter, radius, projected area and volume of the virtual football. The reference contour scale information is a parameter and corresponding value characterizing the diameter, radius, projected area or volume of the virtual football. For example, the reference contour scale information may be: the virtual football with a diameter equal to 0.6 m or a projected area equal to 0.28 m² or the like.

S2032, determining the display motion scale information corresponding to the reference motion scale information of the virtual object according to the scale adjustment coefficient.

In a possible implementation, the virtual object in the reference environment is dynamic, and therefore, the corresponding virtual object in the augmented reality space is also dynamic. For example, the virtual object may move from one position to another position according to a user instruction or a preset rule. The process is the motion process of the virtual object, and the information, which describes a moving distance of the virtual object in the motion process in the reference environment, is the reference motion scale information.

Figure 10:
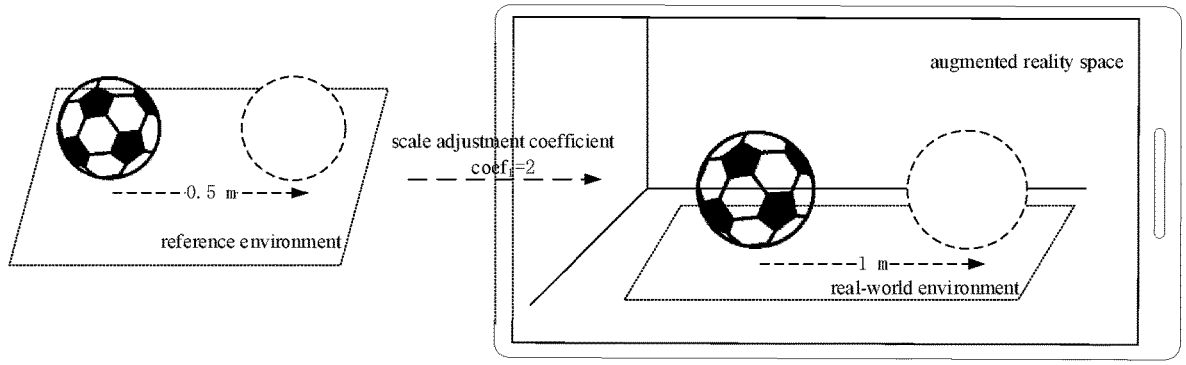
FIG. 10 is a schematic diagram illustrating a motion process of a virtual object according to embodiments of the present disclosure.

FIG. 10 is a schematic diagram illustrating a motion process of a virtual object according to embodiments of the present disclosure. Referring to FIG. 10, the virtual object may move in the reference environment according to a user instruction or a preset rule. When the virtual object moves in the augmented reality space, in order to guarantee that a moving distance matches the real-world environment represented by the augmented reality space, the moving distance of the virtual object needs to be adjusted according to the scale adjustment coefficient, and the display motion scale information matching the real-world environment is generated. Specifically, as shown in FIG. 10, if the virtual object is a virtual football and the moving distance (i.e., the reference motion scale information) of the virtual football in the reference environment is 0.5 m, the moving distance (i.e., the display motion scale information) of the virtual football in the augmented reality space is determined to be 1 m according to the scale adjustment coefficient coef1=2.

Figure 11:
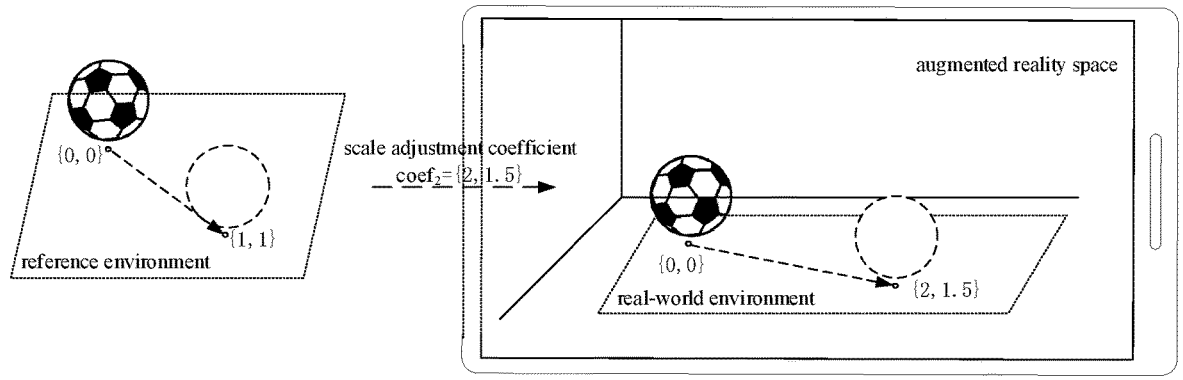
FIG. 11 is a schematic diagram of determining a moving distance of a virtual object with a scale adjustment coefficient according to embodiments of the present disclosure.

It needs to be noted that when the scale adjustment coefficient is a sequence or matrix composed of a plurality of coefficients, the reference motion scale information of the virtual object may be adjusted in a plurality of dimensions according to the scale adjustment coefficient. FIG. 11 is a schematic diagram of determining a moving distance of a virtual object with a scale adjustment coefficient according to embodiments of the present disclosure. Referring to FIG. 11, the reference motion scale information of the virtual object in the reference environment is dis_1={1,1}, indicating that the virtual object moves from the origin {0,0} to position {1,1}. The scale adjustment coefficient coef2 is {2,1.5}. The reference motion scale information of the virtual object is adjusted according to the scale adjustment coefficient, causing the moving distances of the virtual object in both dimensions of X and Y to change in different proportions, and the acquired display motion scale information dis_2 is {2,1.5}. That is, in the augmented reality space, the virtual object moves from the origin {0,0} to {2,1.5}. Thus, the adjustment of the moving distances of the virtual object in different dimensions is realized.

Here, it needs to be noted that in a possible implementation, the technical solutions corresponding to steps S2031 and S2032 may be carried out together. That is, the reference contour scale information and the reference motion scale information of the virtual object are adjusted simultaneously according to the scale adjustment coefficient to generate the display contour scale information and the display motion scale information. In another possible implementation, the technical solutions corresponding to steps S2031 and S2032 may be carried out separately. That is, only the reference contour scale information or the reference motion scale information of the virtual object is adjusted according to the scale adjustment coefficient to generate the display contour scale information or the display motion scale information, correspondingly, and the unadjusted reference contour scale information or reference motion scale information is directly processed as the display contour scale information or the display motion scale information. This is not specifically limited here.

S204: displaying the virtual object in the augmented reality space of the first client according to the display scale information.

In this embodiment, steps S201 and S204 are implemented in the same way as steps S101 and S103 in the embodiment described above, which may be referred to the discussions of steps S101 and S103 for details and will not be described here redundantly.

Figure 12:
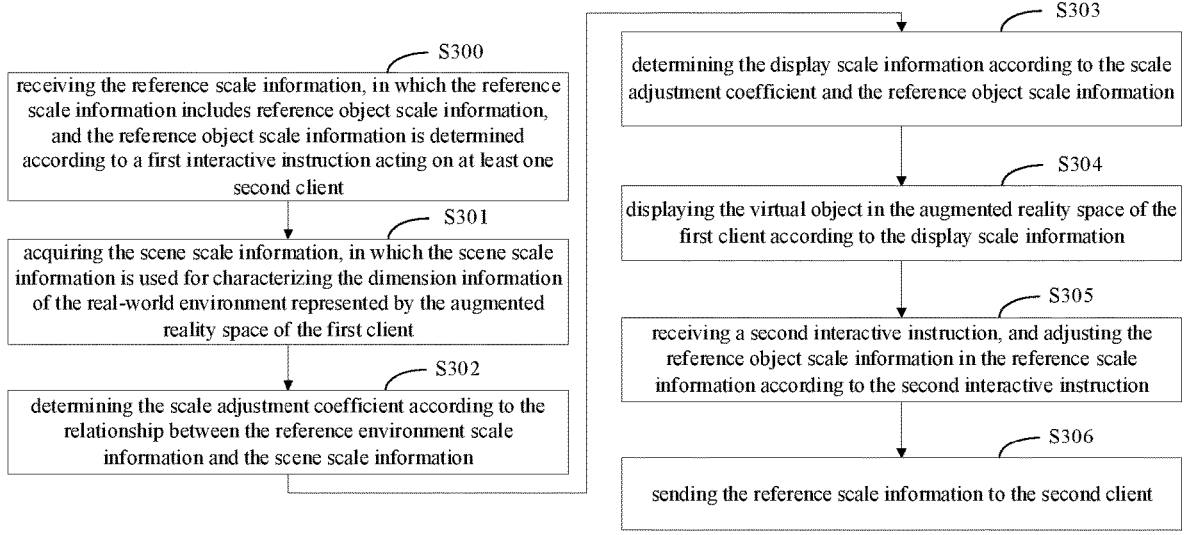
FIG. 12 is a third flowchart of a method for augmented reality interactive display according to embodiments of the present disclosure.

FIG. 12 is a third flowchart of a method for augmented reality interactive display according to embodiments of the present disclosure. In this embodiment of the present disclosure, a step of receiving and sending the reference scale information is added on the basis of the embodiment shown in FIG. 6. The method for augmented reality interactive display provided in this embodiment may be applied to a multi-user interaction scene to realize the multi-user interaction function based on AR among a plurality of users. Referring to FIG. 12, this embodiment involves the following steps.

S300: receiving the reference scale information, in which the reference scale information includes reference object scale information, and the reference object scale information is determined according to a first interactive instruction acting on at least one second client.

In a possible implementation, the first client communicates with a corresponding server-side and receives the reference scale information sent from the server-side. More specifically, the reference scale information is included in a communication message sent from the server-side to the first client, and the first client acquires the reference scale information by receiving the communication message sent from the server-side.

Further, the reference scale information includes the reference object scale information used for characterizing the scale information of the virtual object in the reference environment. The reference object scale information is determined by the second client running on the second terminal device according to the first interactive instruction acting on the second client, and then the reference object scale information is sent to the server-side. Exemplarily, the second client runs on the second terminal device, and a user inputs the first interactive instruction to the second client through the human-machine interaction interface of the second terminal device to cause a change in the reference object scale information in the second client, for example, to cause a change in the contour dimension of the virtual object and/or to cause the virtual object to move. Specifically, for example, by swiping or tapping on the screen, the virtual object in the augmented reality space of the second client is controlled to change in contour dimension or to move. More specifically, the first interactive instruction is in a preset operation mapping relationship with the reference object scale information. For example, an operation instruction of tapping on the screen at a preset position may change the reference contour dimension information in the reference object scale information of the virtual object; an operation instruction of swiping the screen at a preset position may change the reference motion dimension information in the reference object scale information of the virtual object. When the reference object scale information of the virtual object changes, the display object dimension information of the virtual object also changes synchronously accordingly, i.e., the display image of the virtual object in the augmented reality space changes. The second client then communicates with the server-side and sends the reference object scale information to the server-side through the communication message.

S301: acquiring the scene scale information, in which the scene scale information is used for characterizing the dimension information of the real-world environment represented by the augmented reality space of the first client.

S302: determining the scale adjustment coefficient according to the relationship between the reference environment scale information and the scene scale information.

S303: determining the display scale information according to the scale adjustment coefficient and the reference object scale information.

S304: displaying the virtual object in the augmented reality space of the first client according to the display scale information.

The implementation and corresponding beneficial effects of steps S301-S304 in this embodiment of the present disclosure are similar to those of steps S201-S204 in the embodiment shown in FIG. 6, which may be referred to the descriptions in the embodiment shown in FIG. 6 for details and will not be described here redundantly.

S305: receiving a second interactive instruction, and adjusting the reference object scale information in the reference scale information according to the second interactive instruction.

Exemplarily, the second interactive instruction is instruction information input by a user through the human-machine interaction interface of the first terminal device to the first client, in which the second interactive instruction is implemented in the same way as the first interactive instruction. Specifically, for example, by swiping or tapping on the screen, the virtual object in the augmented reality space of the first client is controlled to change in contour dimension or to move. More specifically, the second interactive instruction is in a preset operation mapping relationship with the reference object scale information. For example, an operation instruction of tapping on the screen at a preset position may change the reference contour dimension information in the reference object scale information of the virtual object; an operation instruction of swiping the screen at a preset position may change the reference motion dimension information in the reference object scale information of the virtual object. When the reference object scale information of the virtual object changes, the display object dimension information of the virtual object also changes synchronously accordingly, i.e., the display image of the virtual object in the augmented reality space changes. The first client adjusts the reference object scale information in the reference scale information according to the received second interactive instruction and the preset operation mapping relationship.

It needs to be noted that after the reference object scale information in the reference scale information is changed, the display object dimension information corresponding to the virtual object may also change synchronously. The first terminal device may continue to perform the steps in the embodiment shown in FIG. 3 or FIG. 6 to display the virtual object with the changed reference object scale information in the augmented reality space of the first client.

Exemplarily, step S305 may be performed together with other steps in this embodiment or may be performed independently of other steps in this embodiment, which will not be limited here.

S306: sending the reference scale information to the second client.

Specifically, to realize interaction among a plurality of clients, the first client sends the reference scale information generated according to the second interactive instruction to the second client, allowing the second client to display the virtual object with the corresponding contour dimension and moving distance in the augmented reality space according to the reference scale information, and thus realizing the interaction between the first client and the second client.

Figure 13:
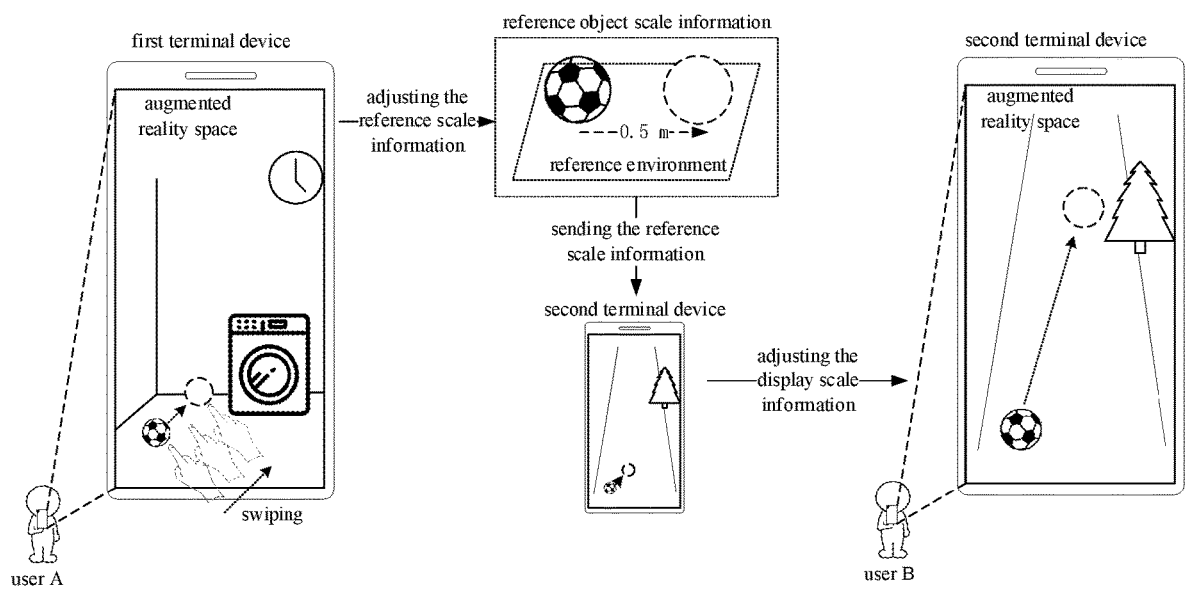
FIG. 13 is a schematic diagram of realizing multi-user interaction by adjusting a virtual object with an interactive instruction according to embodiments of the present disclosure.

FIG. 13 is a schematic diagram of realizing multi-user interaction by adjusting a virtual object with an interactive instruction according to embodiments of the present disclosure. Referring to FIG. 13, the first terminal device is a smart phone, and a user swipes the screen on the smart phone to adjust the reference object scale information in the reference scale information, causing the virtual football in the augmented reality space of the first client to move a corresponding distance. Meanwhile, by sending the reference scale information to the second terminal device, the virtual football in the augmented reality space of the second client also move a corresponding distance that matches the real-world environment where the second terminal device is placed.

To better illustrate the implementation process of the method for augmented reality interactive display provided in this embodiment, the following description is made below by taking a more specific embodiment as an example.

Figure 14:
FIG. 14 is a chart of interactive signaling in a method for augmented reality interactive display according to embodiments of the present disclosure.

FIG. 14 is a chart of interactive signaling in a method for augmented reality interactive display according to embodiments of the present disclosure. Referring to FIG. 14, a first client runs on a first terminal device, while a second client runs on a second terminal device. Exemplarily, the first client and the second client may be the same application client based on AR, for example, an AR game client. The first client and the second client communicate with a server-side, and the server-side provides services such as information processing and message forwarding for the first client and the second client so that information interaction may be realized between the first client and the second client. The server-side runs on a server, and the first terminal device and the second terminal device are in communication connection with the server via a network, respectively. This embodiment involves steps as follows:

S401, the server establishes the communication connection of the first terminal device with the second terminal device.

S402, the first terminal device acquires scene scale information and preset reference scale information, in which the reference scale information includes reference environment scale information and reference object scale information.

S403, the first terminal device determines a scale adjustment coefficient according to a relationship between the reference environment scale information and the scene scale information.

S404, the first terminal device determines display scale information according to the scale adjustment coefficient and the reference object scale information.

S405, the first terminal device displays a virtual object in the augmented reality space of the first client according to the display scale information.

S406, the first terminal device receives a swiping instruction input from a user and adjusts the reference motion scale information in the reference object scale information of the virtual object according to the swiping instruction.

S407, the first terminal device redetermines the display scale information according to the reference object scale information and displays the virtual object according to the display scale information.

S408, the first terminal device sends the reference scale information, which includes the reference object scale information, to the server.

S409, the server forwards the reference scale information to at least one second terminal device.

S410, the second terminal device acquires scene scale information and the reference scale information, in which the reference scale information includes the reference environment scale information and the reference object scale information.

S411, the second terminal device determines a scale adjustment coefficient according to a relationship between the reference environment scale information and the scene scale information.

S412, the second terminal device determines display scale information according to the scale adjustment coefficient and the reference object scale information.

S413, the second terminal device displays a virtual object in the augmented reality space of the first client according to the display scale information.

S414: the second terminal device receives a tapping instruction input from a user and adjusts the reference contour scale information in the reference object scale information of the virtual object according to the tapping instruction.

S415, the second terminal device redetermines the display scale information according to the reference object scale information and displays the virtual object according to the display scale information.

S416, the second terminal device sends the reference scale information, which includes the reference object scale information, to the server.

S417, the server forwards the reference scale information to at least one first terminal device.

In this embodiment of the present disclosure, by synchronizing the reference object scale information among a plurality of terminal devices, dynamic interaction based on AR among the plurality of terminal devices may be realized. Meanwhile, the plurality of terminal devices perform weighted adjustment and display on the reference object scale information according to the scene scale information corresponding to the environment in which they are located, so that the virtual object in the augmented reality space may match different environment dimensions. With reference to the embodiment shown in FIG. 13, when a user inputs the swiping instruction to the first terminal device, the virtual football in the augmented reality space of the first client moves, for example, 0.5 m. The first client then synchronizes the reference dimension information corresponding to the virtual football to the second client of the second terminal device via the server. The second client perform weighted adjustment and display on the reference object scale information in the reference dimension information according to the scene scale information, causing the virtual football to move, for example, 3 m in the augmented display space of the second client. Thus, the moving distance of the small ball better matches the real-world environment displayed by the second client, thereby improving the visual effect of the virtual object and enhancing the experience of user interaction.

Figure 15:
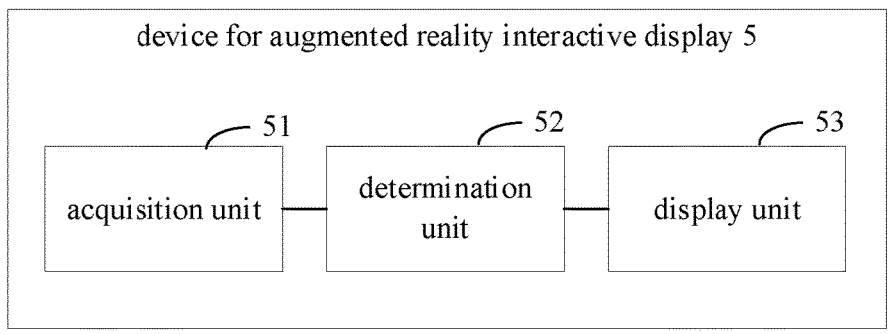
FIG. 15 is a structure block diagram of a device for augmented reality interactive display according to embodiments of the present disclosure.

Corresponding to the method for augmented reality interactive display in the foregoing embodiments, FIG. 15 is a structure block diagram of a device for augmented reality interactive display according to embodiments of the present disclosure. For ease of description, only the parts related to this embodiment of the present disclosure are illustrated. Referring to FIG. 15, the device 5 for augmented reality interactive display includes:

an acquisition unit 51, configured to acquire scene scale information, in which the scene scale information is used for characterizing dimension information of a real-world environment represented by an augmented reality space of a first client;

a determination unit 52, configured to determine display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client; and a display unit 53, configured to display the virtual object in the augmented reality space of the first client according to the display scale information.

The acquisition unit 51, the determination unit 52 and the display unit 53 are connected in sequence. The device 5 for augmented reality interactive display provided in this embodiment may perform the technical solutions of the method embodiments shown in FIG. 3 to FIG. 5, and implementation principles and technical effects thereof are similar, which will not be described here redundantly.

Figure 16:
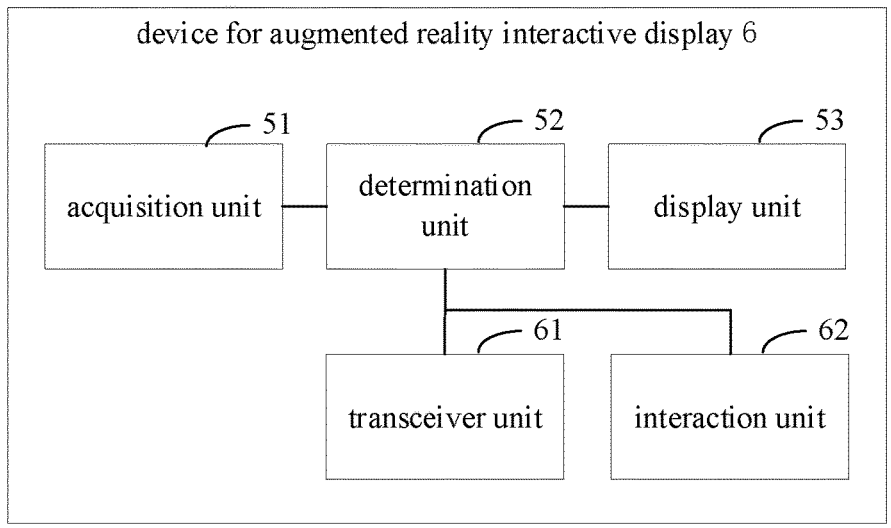
FIG. 16 is a structure block diagram of another device for augmented reality interactive display according to embodiments of the present disclosure.

FIG. 16 is a structure block diagram of another device for augmented reality interactive display according to embodiments of the present disclosure. The device 6 for augmented reality interactive display provided in this embodiment is further detailed on the basis of the device for augmented reality interactive display provided in the embodiment shown in FIG. 15, and added with a transceiver unit 61 and an interaction unit 62 as shown in FIG. 16.

In a possible implementation, the reference scale information includes reference environment scale information and reference object scale information, and the reference object scale information is used for characterizing reference dimension information of the virtual object in the reference environment. The determination unit 52 is specifically configured to determine a scale adjustment coefficient according to a relationship between the reference environment scale information and the scene scale information, and to determine the display scale information according to the scale adjustment coefficient and the reference object scale information.

In a possible implementation, the reference object scale information includes reference contour scale information of the virtual object, and the display scale information includes display contour scale information. The display unit 53 is specifically configured to determine the display contour scale information according to the scale adjustment coefficient and the reference contour scale information, and to display the virtual object in the augmented reality space of the first client according to the display contour scale information.

In a possible implementation, the reference object scale information includes reference motion scale information of the virtual object, and the reference motion scale information is used for characterizing a moving distance of the virtual object in the reference environment.

In a possible implementation, the display scale information further includes display motion scale information, and the display motion scale information is used for characterizing a moving distance of the virtual object in the augmented reality space. The display unit 53 is specifically configured to determine the display motion scale information according to the scale adjustment coefficient and the reference motion scale information, and to move the virtual object a distance corresponding to the moving distance of the virtual object displayed in the augmented reality space in the augmented reality space of the first client according to the display motion scale information.

In a possible implementation, the acquisition unit 51 is specifically configured to acquire video image information of the real-world environment, and to determine the scene scale information by a preset SLAM algorithm according to the video image information.

In a possible implementation, the device 6 for augmented reality interactive display further includes the transceiver unit 61, which is configured to receive the reference scale information, in which the reference scale information includes the reference object scale information, and the reference object scale information is determined according to a first interactive instruction acting on at least one second client.

In a possible implementation, the device 6 for augmented reality interactive display further includes an interaction unit 62, which is configured to receive a second interactive instruction. The determination unit 52 is further configured to adjust the reference object scale information in the reference scale information according to the second interactive instruction.

The device 6 for augmented reality interactive display provided in this embodiment may perform the technical solutions in the method embodiments shown in FIG. 6 to FIG. 13 and the technical solutions performed by the first terminal device and the second terminal device in the embodiment shown in FIG. 14, and implementation principles and technical effects thereof are similar, which will not be described here redundantly.

Figure 17:
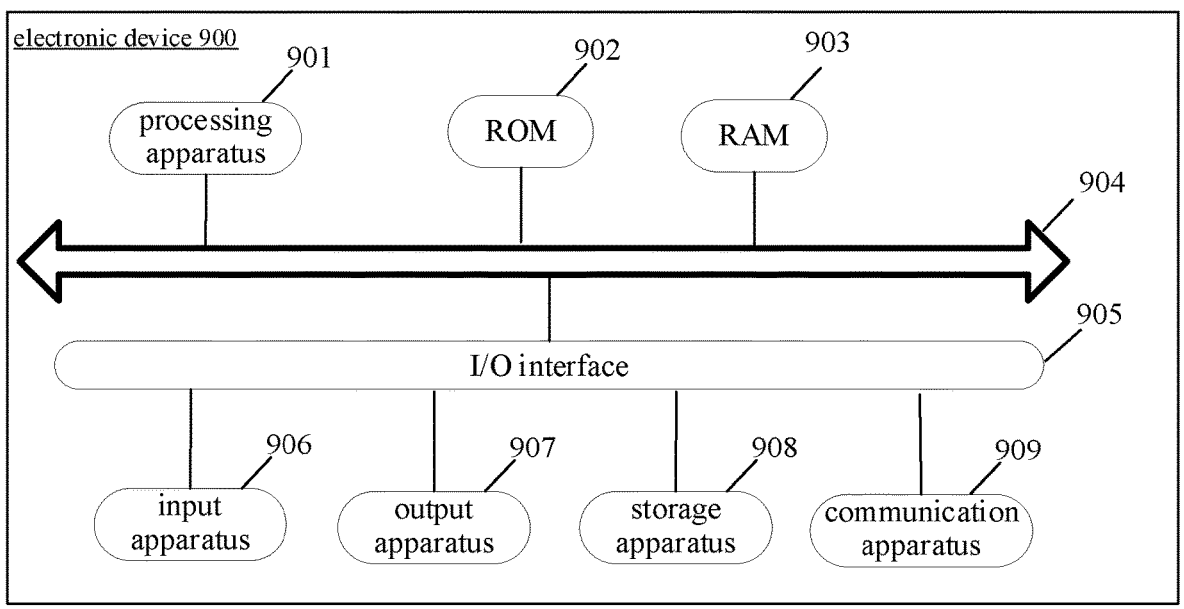
FIG. 17 is a structural schematic diagram of an electronic device according to embodiments of the present disclosure.

Reference is now made to FIG. 17, which is a structural schematic diagram of an electronic device 900 adapted to implement the embodiments of the present disclosure. The electronic device 900 may be a terminal device or a server. The terminal device may include but be not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and a wearable electronic device, and stationary terminals such as a digital TV, a desktop computer, and a smart home device. The electronic device shown in FIG. 17 is merely an example, and should not impose any limitation on the functions and use scope of the embodiments of the present disclosure.

As shown in FIG. 17, the electronic device 900 may include a processing apparatus (e.g., a central processing unit, or a graphics processor) 901, which may perform various suitable actions and processing according to a program stored on a read-only memory (ROM) 902 or a program loaded from a storage apparatus 908 into a random access memory (RAM) 903. The RAM 903 further stores various programs and data required for operations of the electronic device 900. The processing apparatus 901, the ROM 902, and the RAM 903 are interconnected through a bus 904. An input/output (I/O) interface 905 is also connected to the bus 904.

Usually, the following apparatuses may be connected to the I/O interface 905: an input apparatus 906 including, for example, a touch screen, a touch pad, a keyboard, a mouse, a camera, a microphone, an accelerometer, and a gyroscope, etc.; an output apparatus 907 including, for example, a liquid crystal display (LCD), a loudspeaker, and a vibrator, etc.; a storage apparatus 908 including, for example, a magnetic tape and a hard disk, etc.; and a communication apparatus 909. The communication apparatus 909 may allow the electronic device 900 to be in wireless or wired communication with other devices to exchange data. While FIG. 17 illustrates the electronic device 900 having various apparatuses, it is to be understood that not all the illustrated apparatuses are necessarily implemented or included. More or less apparatuses may be implemented or included alternatively.

Particularly, according to the embodiments of the present disclosure, the process described above with reference to the flowchart may be implemented as a computer software program. For example, the embodiment of the present disclosure includes a computer program product, which includes a computer program carried by a computer readable medium. The computer program includes a program code for executing the method shown in the flowchart. In such an embodiment, the computer program may be downloaded and installed online through the communication apparatus 909, or installed from the storage apparatus 908, or installed from the ROM 902. When the computer program is executed by the processing apparatus 901, the functions defined in the method of the embodiments of the present disclosure are executed.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above. In the present disclosure, the computer-readable storage medium may be any tangible medium that contains or stores a program that may be used by or in conjunction with an instruction executing system, an apparatus, or a device. In the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to perform the method as shown in the above-mentioned embodiments.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which includes one or more executable instructions for implementing specified logical function. It should also be noted that, in some alternative implementations, the functions noted in the block may occur out of the order noted in the accompanying drawings. For example, two blocks shown in succession may, in fact, may be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units as described in some embodiments of the present disclosure may be implemented by means of software, or may also be implemented by means of hardware. The name of a unit does not constitute a limitation on the unit itself. For example, a first acquisition unit may also be described as "a unit for acquiring at least two Internet protocol addresses".

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may contain or store a program for use by an instruction execution system, apparatus or device, or may contain or store a program for use in conjunction with an instruction execution system, apparatus or device. The machine-readable medium may be a machine-readable signal medium or a machine-readable storage medium. Machine-readable media may include, but are not limited to, an electronic, magnetic, optical, electromagnetic, infrared, or semiconductor system, apparatus, or device, or any suitable combination of the above. More specific examples of the machine-readable storage medium may include: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above.

In a first aspect, according to one or more embodiments of the present disclosure, the present disclosure provides a method for augmented reality interactive display, the method includes:

acquiring scene scale information, in which the scene scale information is used for characterizing dimension information of a real-world environment represented by an augmented reality space of a first client; determining display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client; and displaying the virtual object in the augmented reality space of the first client according to the display scale information.

According to one or more embodiments of the present disclosure, the reference scale information includes reference environment scale information and reference object scale information, and the reference object scale information is used for characterizing reference dimension information of the virtual object in the reference environment; and determining the display scale information of the virtual object according to the scene scale information and the reference scale information includes: determining a scale adjustment coefficient according to a relationship between the reference environment scale information and the scene scale information; and determining the display scale information according to the scale adjustment coefficient and the reference object scale information.

According to one or more embodiments of the present disclosure, the reference object scale information includes reference contour scale information of the virtual object, and the display scale information includes display contour scale information; and displaying the virtual object in the augmented reality space of the first client according to the display scale information includes: determining the display contour scale information according to the scale adjustment coefficient and the reference contour scale information; and displaying the virtual object in the augmented reality space of the first client according to the display contour scale information.

According to one or more embodiments of the present disclosure, the reference object scale information includes reference motion scale information of the virtual object, and the reference motion scale information is used for characterizing a moving distance of the virtual object in the reference environment.

According to one or more embodiments of the present disclosure, the display scale information further includes display motion scale information, and the display motion scale information is used for characterizing a moving distance of the virtual object displayed in the augmented reality space; and displaying the virtual object in the augmented reality space of the first client according to the display scale information further includes: determining the display motion scale information according to the scale adjustment coefficient and the reference motion scale information; and moving the virtual object a distance corresponding to the moving distance of the virtual object displayed in the augmented reality space in the augmented reality space of the first client according to the display motion scale information.

According to one or more embodiments of the present disclosure, acquiring the scene scale information includes: acquiring video image information of the real-world environment; and determining the scene scale information by a preset SLAM algorithm according to the video image information.

According to one or more embodiments of the present disclosure, the method further includes: receiving the reference scale information, in which the reference scale information includes reference object scale information, and the reference object scale information is determined according to a first interactive instruction acting on at least one second client.

According to one or more embodiments of the present disclosure, the method further includes: receiving a second interactive instruction; and adjusting reference object scale information in the reference scale information according to the second interactive instruction.

In a second aspect, according to one or more embodiments of the present disclosure, the present disclosure provides a device for augmented reality interactive display, the device includes:

an acquisition unit, configured to acquire scene scale information, in which the scene scale information is used for characterizing dimension information of a real-world environment represented by an augmented reality space of a first client;

a determination unit, configured to determine display scale information of a virtual object according to the scene scale information and reference scale information, in which the reference scale information is used for characterizing dimension information of the virtual object in a reference environment, and the display scale information is used for characterizing dimension information of the virtual object in the augmented reality space of the first client; and a display unit, configured to display the virtual object in the augmented reality space of the first client according to the display scale information.

According to one or more embodiments of the present disclosure, the reference scale information includes reference environment scale information and reference object scale information, and the reference object scale information is used for characterizing reference dimension information of the virtual object in the reference environment. The determination unit is specifically configured to determine a scale adjustment coefficient according to a relationship between the reference environment scale information and the scene scale information, and to determine the display scale information according to the scale adjustment coefficient and the reference object scale information.

According to one or more embodiments of the present disclosure, the reference object scale information includes reference contour scale information of the virtual object, and the display scale information includes display contour scale information. The display unit is specifically configured to determine the display contour scale information according to the scale adjustment coefficient and the reference contour scale information, and to display the virtual object in the augmented reality space of the first client according to the display contour scale information.

According to one or more embodiments of the present disclosure, the reference object scale information includes reference motion scale information of the virtual object, and the reference motion scale information is used for characterizing a moving distance of the virtual object in the reference environment.

According to one or more embodiments of the present disclosure, the display scale information further includes display motion scale information, and the display motion scale information is used for characterizing a moving distance of the virtual object in the augmented reality space. The display unit is specifically configured to determine the display motion scale information according to the scale adjustment coefficient and the reference motion scale information, and to move the virtual object a distance corresponding to the moving distance of the virtual object displayed in the augmented reality space in the augmented reality space of the first client according to the display motion scale information.

According to one or more embodiments of the present disclosure, the acquisition unit is specifically configured to acquire video image information of the real-world environment, and to determine the scene scale information by a preset SLAM algorithm according to the video image information.

According to one or more embodiments of the present disclosure, the device for augmented reality interactive display further includes the transceiver unit, which is configured to receive the reference scale information, in which the reference scale information includes the reference object scale information, and the reference object scale information is determined according to a first interactive instruction acting on at least one second client.

According to one or more embodiments of the present disclosure, the device 6 for augmented reality interactive display further includes an interaction unit, which is configured to receive a second interactive instruction. The determination unit is further configured to adjust the reference object scale information in the reference scale information according to the second interactive instruction.

In a third aspect, according to one or more embodiments of the present disclosure, the present disclosure provides an electronic device, the electronic device includes: at least one processor and a memory, in which the memory stores computer executable instructions; and the at least one processor executes the computer executable instructions stored on the memory, and the computer executable instructions, upon execution by the processor, cause the at least one processor to implement the method for augmented reality interactive display as described in the first aspect and various possible designs of the first aspect above.

In a fourth aspect, according to one or more embodiments of the present disclosure, the present disclosure provides a computer-readable storage medium, on which computer executable instructions are stored, in which the computer executable instructions, when executed by a processor, cause the processor to implement the method for augmented reality interactive display as described in the first aspect and various possible designs of the first aspect above.

The above descriptions are merely some preferred embodiments of the present disclosure and illustrations of the applied technical principles. Those skilled in the art should understand that the scope of the present disclosure involved in the embodiments of the present disclosure is not limited to the technical solution formed by the specific combination of the above-mentioned technical features, and should also cover, without departing from the above-mentioned inventive concept, other technical solutions formed by any combination of the above-mentioned technical features or their equivalent features, for example, the technical solution formed by replacing the above features with the technical features with similar functions disclosed in the embodiments of the present disclosure (but not limited to).

Additionally, although operations are depicted in a specific order, it should not be construed as requiring that the operations be executed in the specific order as shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments may also be implemented in combination in a single embodiment. Conversely, various features that are described in the context of a single embodiment may also be implemented in various embodiments separately or in any suitable sub-combination.

Although the subject matter has been described in language specific to structural features and/or logical actions of methods, it should be understood that the subject matter defined in the appended claims is not necessarily limited to the specific features or actions described above. Conversely, the specific features and actions described above are merely example forms for implementing the claims.

What is claimed is:

1. A method for augmented reality interactive display, comprising:

acquiring scene scale information, wherein the scene scale information is used for characterizing dimension information of a real-world environment represented by an augmented reality space of a first client;

determining display scale information of a virtual object according to the scene scale information and reference scale information, wherein the reference scale information is used for characterizing dimension information of the virtual object in a reference environment, and the display scale information is used for characterizing dimension information of the virtual object in the augmented reality space of the first client; and displaying the virtual object in the augmented reality space of the first client according to the display scale information;

wherein the reference scale information comprises reference environment scale information and reference object scale information, and the reference object scale information is used for characterizing reference dimension information of the virtual object in the reference environment; and determining the display scale information of the virtual object according to the scene scale information and the reference scale information comprises:

determining a scale adjustment coefficient according to a relationship between the reference environment scale information and the scene scale information; and determining the display scale information according to the scale adjustment coefficient and the reference object scale information.

2. The method according to claim 1, wherein the reference object scale information comprises reference contour scale information of the virtual object, and the display scale information comprises display contour scale information; and displaying the virtual object in the augmented reality space of the first client according to the display scale information comprises:

determining the display contour scale information according to the scale adjustment coefficient and the reference contour scale information; and displaying the virtual object in the augmented reality space of the first client according to the display contour scale information.

3. The method according to claim 2, wherein acquiring the scene scale information comprises:

acquiring video image information of the real-world environment; and determining the scene scale information by a preset simultaneous localization and mapping (SLAM) algorithm according to the video image information.

4. The method according to claim 2, further comprising:

receiving the reference scale information, wherein the reference scale information comprises reference object scale information, and the reference object scale information is determined according to a first interactive instruction acting on at least one second client.

5. The method according to claim 1, wherein the reference object scale information comprises reference motion scale information of the virtual object, and the reference motion scale information is used for characterizing a moving distance of the virtual object in the reference environment.

6. The method according to claim 5, wherein the display scale information further comprises display motion scale information, and the display motion scale information is used for characterizing a moving distance of the virtual object displayed in the augmented reality space; and
   displaying the virtual object in the augmented reality space of the first client according to the display scale information further comprises:
   determining the display motion scale information according to the scale adjustment coefficient and the reference motion scale information; and
   moving the virtual object a distance corresponding to the moving distance of the virtual object displayed in the augmented reality space in the augmented reality space of the first client according to the display motion scale information.

7. The method according to claim 5, wherein acquiring the scene scale information comprises:
   acquiring video image information of the real-world environment; and
   determining the scene scale information by a preset simultaneous localization and mapping (SLAM) algorithm according to the video image information.

8. The method according to claim 5, further comprising:
   receiving the reference scale information, wherein the reference scale information comprises reference object scale information, and the reference object scale information is determined according to a first interactive instruction acting on at least one second client.

9. The method according to claim 1, wherein acquiring the scene scale information comprises:
   acquiring video image information of the real-world environment; and
   determining the scene scale information by a preset simultaneous localization and mapping (SLAM) algorithm according to the video image information.

10. The method according to claim 1, further comprising:
    receiving the reference scale information, wherein the reference scale information comprises reference object scale information, and the reference object scale information is determined according to a first interactive instruction acting on at least one second client.

11. The method according to claim 10, further comprising:
    receiving a second interactive instruction; and
    adjusting reference object scale information in the reference scale information according to the second interactive instruction.

12. A device for augmented reality interactive display, comprising:
    an acquisition unit, configured to acquire scene scale information, wherein the scene scale information is used for characterizing dimension information of a real-world environment represented by an augmented reality space of a first client;
    a determination unit, configured to determine display scale information of a virtual object according to the scene scale information and reference scale information, wherein the reference scale information is used for characterizing dimension information of the virtual object in a reference environment, and the display scale information is used for characterizing dimension information of the virtual object in the augmented reality space of the first client; and
    a display unit, configured to display the virtual object in the augmented reality space of the first client according to the display scale information;
    wherein the reference scale information comprises reference environment scale information and reference object scale information, and the reference object scale information is used for characterizing reference dimension information of the virtual object in the reference environment; and
    the determination unit is further configured to:
    determine a scale adjustment coefficient according to a relationship between the reference environment scale information and the scene scale information; and
    determine the display scale information according to the scale adjustment coefficient and the reference object scale information.

13. An electronic device, comprising:
    at least one processor and a memory,
    wherein the memory stores computer executable instructions; and
    the at least one processor executes the computer executable instructions stored on the memory, and the computer executable instructions, upon execution by the processor, cause the at least one processor to:
    acquire scene scale information, wherein the scene scale information is used for characterizing dimension information of a real-world environment represented by an augmented reality space of a first client;
    determine display scale information of a virtual object according to the scene scale information and reference scale information, wherein the reference scale information is used for characterizing dimension information of the virtual object in a reference environment, and the display scale information is used for characterizing dimension information of the virtual object in the augmented reality space of the first client; and
    display the virtual object in the augmented reality space of the first client according to the display scale information;
    wherein the reference scale information comprises reference environment scale information and reference object scale information, and the reference object scale information is used for characterizing reference dimension information of the virtual object in the reference environment; and
    determining the display scale information of the virtual object according to the scene scale information and the reference scale information comprises:
    determining a scale adjustment coefficient according to a relationship between the reference environment scale information and the scene scale information; and
    determining the display scale information according to the scale adjustment coefficient and the reference object scale information.

14. The electronic device according to claim 13, wherein the reference object scale information comprises reference contour scale information of the virtual object, and the display scale information comprises display contour scale information; and
    displaying the virtual object in the augmented reality space of the first client according to the display scale information comprises:
    determining the display contour scale information according to the scale adjustment coefficient and the reference contour scale information; and displaying the virtual object in the augmented reality space of the first client according to the display contour scale information.

15. The electronic device according to claim 13, wherein the reference object scale information comprises reference motion scale information of the virtual object, and the reference motion scale information is used for characterizing a moving distance of the virtual object in the reference environment.

16. The electronic device according to claim 15, wherein the display scale information further comprises display motion scale information, and the display motion scale information is used for characterizing a moving distance of the virtual object displayed in the augmented reality space; and
    displaying the virtual object in the augmented reality space of the first client according to the display scale information further comprises:
        determining the display motion scale information according to the scale adjustment coefficient and the reference motion scale information; and
        moving the virtual object a distance corresponding to the moving distance of the virtual object displayed in the augmented reality space in the augmented reality space of the first client according to the display motion scale information.

17. The electronic device according to claim 13, wherein acquiring the scene scale information comprises:
    acquiring video image information of the real-world environment, and
    determining the scene scale information by a preset simultaneous localization and mapping (SLAM) algorithm according to the video image information.

18. The electronic device according to claim 13, further comprising:
    receiving the reference scale information, wherein the reference scale information comprises reference object scale information, and the reference object scale information is determined according to a first interactive instruction acting on at least one second client.

19. The electronic device according to claim 18, further comprising:
    receiving a second interactive instruction; and
    adjusting reference object scale information in the reference scale information according to the second interactive instruction.

20. A computer-readable storage medium, on which computer executable instructions are stored, wherein the computer executable instructions, when executed by a processor, cause the processor to implement the method for augmented reality interactive display according to claim 1.

* * * * *